United States Patent [19]
Kitano

[11] 3,836,858
[45] Sept. 17, 1974

[54] PULSE WIDTH SETTING APPARATUS

[75] Inventor: Akira Kitano, Nagoya, Japan

[73] Assignee: Nippondenso Co., Ltd., Aichi-ken, Japan

[22] Filed: June 20, 1972

[21] Appl. No.: 264,589

[30] Foreign Application Priority Data

June 30, 1971 Japan .............................. 46-47789

[52] U.S. Cl. ...................... 328/58, 307/265, 328/48
[51] Int. Cl. ........................................... H03k 5/04
[58] Field of Search ........ 307/265; 328/58, 48, 130; 235/92 T, 92 MT

[56] References Cited

UNITED STATES PATENTS

| | | | |
|---|---|---|---|
| 3,539,926 | 11/1970 | Breikss | 307/265 X |
| 3,614,632 | 10/1971 | Leibowitz et al. | 307/265 X |
| 3,629,710 | 12/1971 | Durland | 328/58 |
| 3,639,844 | 2/1972 | Karklys | 328/130 |
| 3,660,693 | 5/1972 | Markey | 328/130 X |

*Primary Examiner*—Stanley D. Miller, Jr.
*Attorney, Agent, or Firm*—Cushman, Darby & Cushman

[57] ABSTRACT

A pulse width setting apparatus provided with a switching circuit which is switched from one state to the other state upon receipt of a trigger pulse, a counting circuit for counting clock pulses, and a comparator for comparing a count of said counting circuit with a given binary code for determining a pulse width and generating a signal when the count becomes equal to the binary code to thereby restore said switching circuit to the original one state.

4 Claims, 12 Drawing Figures

PULSE WIDTH SETTING APPARATUS

BACKGROUND OF THE INVENTION

1. Field of the Invention

The present invention relates to a pulse width setting apparatus for generating pulses having a pulse width set in terms of a digital quantity.

2. Description of the Prior Art

In the past, the setting of a pulse width has been effected analogically by means of, for example, a CR or LC circuit. However, such setting of the pulse width is disadvantageous in that the C, R and L components are considerably unstable against variations in temperature, voltage and the like.

SUMMARY OF THE INVENTION

To solve the foregoing difficulty, it is an object of the present invention to provide a pulse width setting apparatus, in which a crystal oscillator or the like which is stable against variations in temperature, voltage, etc., is employed to oscillate at a reference frequency so that a pulse of a digitally set pulse width is produced by means of a counting circuit and a comparator, thereby permitting the generation of pulses whose pulse width is stable and independent of the external conditions, such as, variations in temperature, voltage, etc.

DESCRIPTION OF THE PREFERRED EMBODIMENTS

Figure 1:
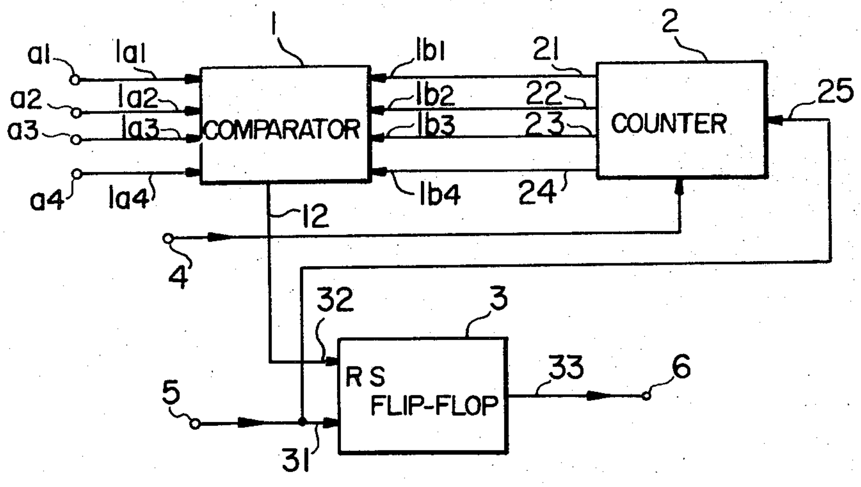
FIG. 1 is a block diagram showing a first embodiment of the pulse width setting apparatus according to the present invention.
Figure 9:
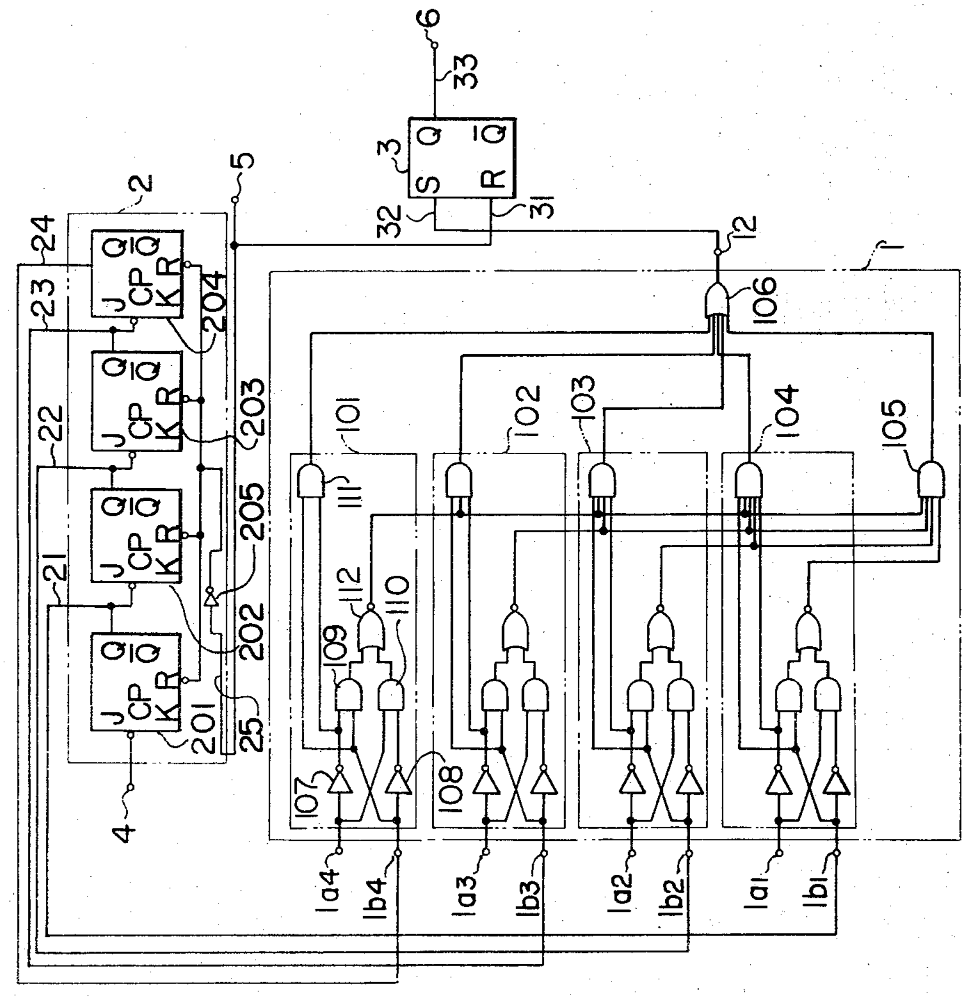
FIG. 9 is a schematic circuit diagram of the first embodiment shown in FIG. 1.

The present invention will now be explained with reference to the illustrated embodiments. Referring first to FIG. 1 illustrating the first embodiment of the invention, numeral 1 designates a digital comparator (in the figure, illustrated as a four-bit digital comparator) which compares a binary code applied to its input terminals $_1a_1$, $_1a_2$, $_1a_3$ and $_1a_4$ with another binary code applied to its input terminals $_1b_1$, $_1b_2$, $_1b_3$ and $_1b_4$ to thereby produce an output at its output terminal 12. Numeral 2 designates a counting circuit for counting clock pulses applied to its input terminal 4. The clock pulses are generated from a crystal oscillator which is not shown. Numeral 3 designates an RS flip-flop having input terminals 31 and 32 and an output terminal 33. Numeral 5 designates an input terminal for trigger pulses; $a_1$, $a_2$, $a_3$ and $a_4$, input terminals where a digital value for determining a pulse width is applied to the comparator; 6 a flip-flop output terminal. The input terminals $a_1$, $a_2$, $a_3$ and $a_4$ correspond to the four bits of the binary code of an input digital value. For example, if $a_1 = 1$, $a_2 = 0$, $a_3 = 1$ and $a_4 = 1$, then this is the binary equivalent of the input decimal number 13. The circuit details of the block diagram of FIG. 1 are illustrated in FIG. 9 in which the digital comparator 1 comprises four unit blocks 101, 102, 103 and 104, an AND gate 105 and an OR gate 106. The unit blocks 101, 102, 103 and 104 are substantially identical in circuit construction and the unit block 101 comprises, by way of typical example, two inverter gates 107 and 108, three AND gates 109, 110 and 111 and an NOR gate 112. This digital comparator 1 consists of the unit manufactured by Texas Instruments Inc., of United States of America. The counting circuit 2 is also of the conventional construction comprising four JK flip-flops 201, 202, 203 and 204 connected in cascade and an additional inverter gate for the reset circuit.

Figure 2:
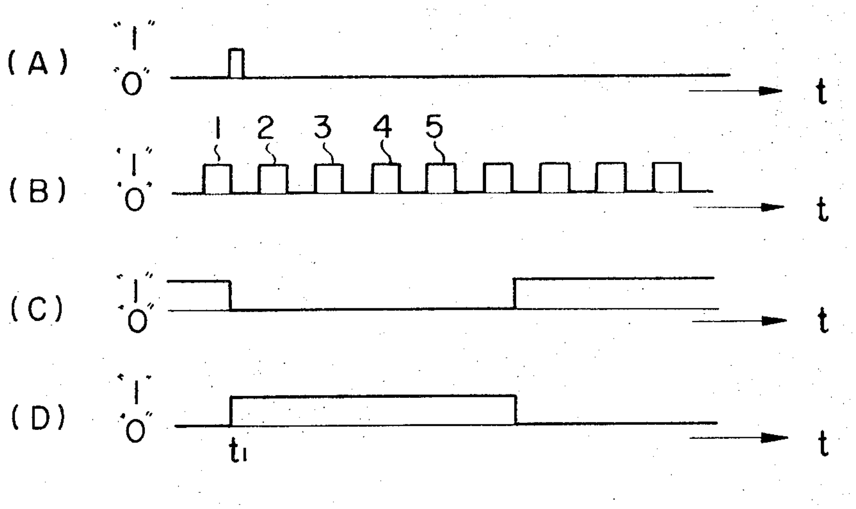
FIG. 2 is a diagram showing the voltage waveforms at various parts of the first embodiment for purposes of explaining the operation thereof.

The operation of the embodiment thus far described is as follows. Assuming that the decimal number of digital input applied to the input terminals $_1a_1$, $_1a_2$, $_1a_3$ and $_1a_4$ on one side of the comparator 1 is represented as A and another digital input to the input terminals $_1b_1$, $_1b_2$, $_1b_3$ and $_1b_4$ on the other side of the comparator 1 is represented as B, then the comparator 1 produces at its output terminal 12 a "1" output when $A \leqq B$ and a "0" output when $A > B$ (assuming that the presence of voltage represents the "1" and the absence of voltage represents the "0"). The counting circuit 2 counts the number of clock pulses applied to the input terminal 4 and produces an output in binary coded form through its output terminals 21, 22, 23 and 24. If, for example, 13 clock pulses are applied to the input terminal 4, then the output terminal 21 = "1," 22 = "0," 23 = "1" and 24 = "1." An input terminal 25 is a reset terminal for the counting circuit 2 and the application of a 1 pulse thereto puts all of the output terminals 21, 22, 23 and 24 of the counting circuit 2 in the 0 state. The RS flip-flop 3 is designed to operate such that the application of a 1 pulse to its input terminal 31 generates a 1 output at its output terminal 6 and this 1 output remains thereat until a 1 pulse is applied to the input terminal 32 when it is changed to 0. Once the output at the output terminal 6 is changed to 0, this 0 output remains until a "1" pulse is applied to the input terminal 31. Now the operation of this embodiment as a whole will be explained with reference to the waveforms shown in FIG. 2. Assuming that the decimal number of an input digital value is 5, the output terminals $a_1$, $a_2$ , $a_3$ and $a_4$ of the comparator 1 are in the 1, 0, 1 and 0 states, respectively. When a 1 pulse is applied to the input terminal 5 at time $t_1$ in FIG. 2 as shown in FIG. 2A, the output terminal 33 of the RS flip-flop 3 and hence the output terminal 6 is put to a 1 level as shown in FIG. 2D. When five clock pulses shown in FIG. 2B are applied to the input terminal 4, the input terminal 12 of the comparator 1 changes from the 0 to 1 level as shown in FIG. 2C, placing the output terminal 33 of the RS flip-flop 3 and hence the output terminal 6 at the 0 level. Consequently, a pulse is produced at the output terminal 6 whose pulse width corresponds to the five clock pulses. In this case, if the frequency of clock pulses is 1 $H_z$, for example, the pulse width of the pulse produced at the output terminal 6 is 5 seconds. This pulse is produced at the output terminal 6 in synchronism with the arrival of a 1 pulse at the input terminal 5. Thus, if the clock pulses having a fixed frequency N $H_z$ are employed with an input digital value M, then a pulse of $1/N \times M$ duration is produced at the output terminal 6 in synchronization with the arrival of a 1 pulse at the input terminal 5.

Figure 3:
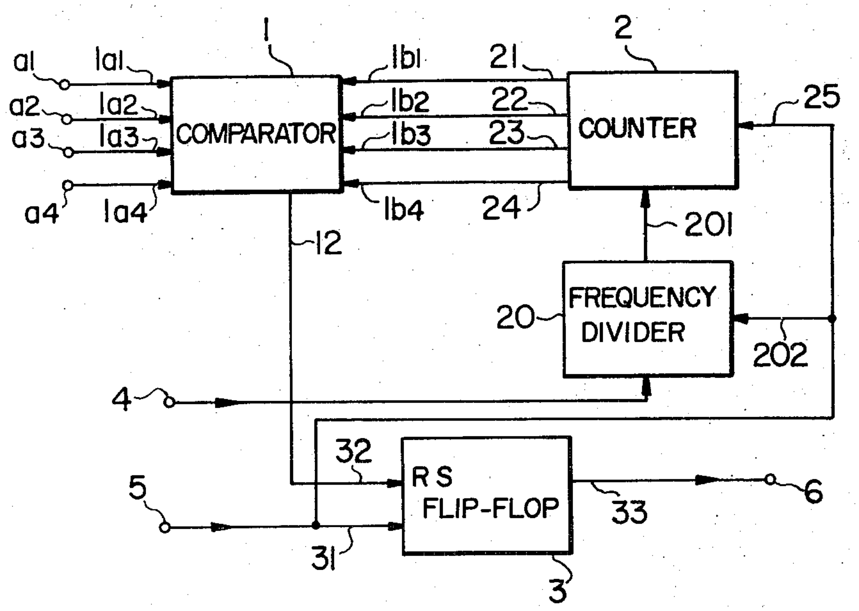
FIG. 3 is a block diagram showing a second embodiment of the apparatus of the present invention.
Figure 10:
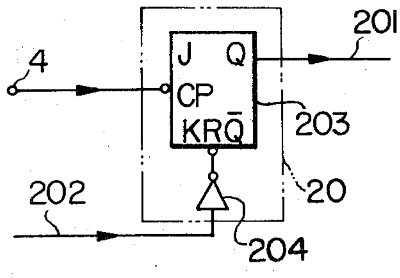
FIG. 10 is a schematic circuit diagram of a frequency divider employed in the embodiment of FIG. 3.

Next, the apparatus according to the second embodiment wherein, as shown in FIG. 3, a frequency divider 20 shown in FIG. 10 is provided in the preceding stage of the counting circuit 2 of FIG. 1 will be explained. In this embodiment, the digital comparator 1, counting circuit 2 and RS flip-flop 3 are identical with those used in the previously explained first embodiment, and the frequency divider 20 comprises, as shown in FIG. 10, a JK flip-flop 203 and a reset circuit inverter gate 204. In operation, clock pulses applied to the input terminal 4 are received by the frequency divider 20 where they are subjected to frequency division and then applied to the counting circuit 2 through an output terminal 201. An input terminal 202 of the frequency divider 20 is a reset terminal which is connected to the input terminal 5 as with the reset terminal 25 of the counting circuit 2.

Figure 4:
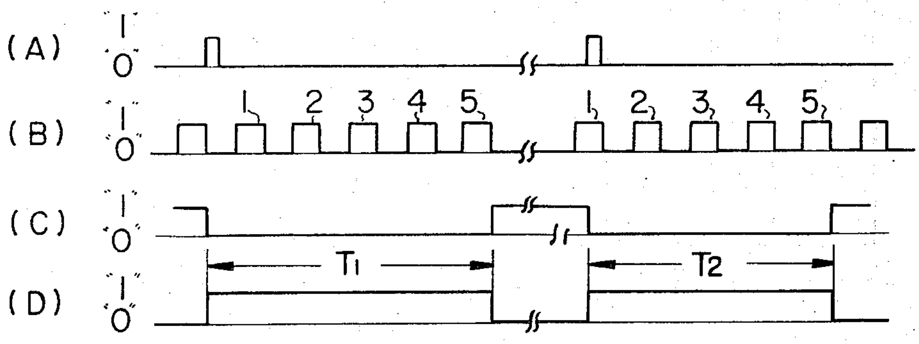
FIGS. 4 and 5 are diagrams showing the various voltage waveforms of the first and second embodiments for purpose of explaining the operation of the second embodiment.
Figure 5:
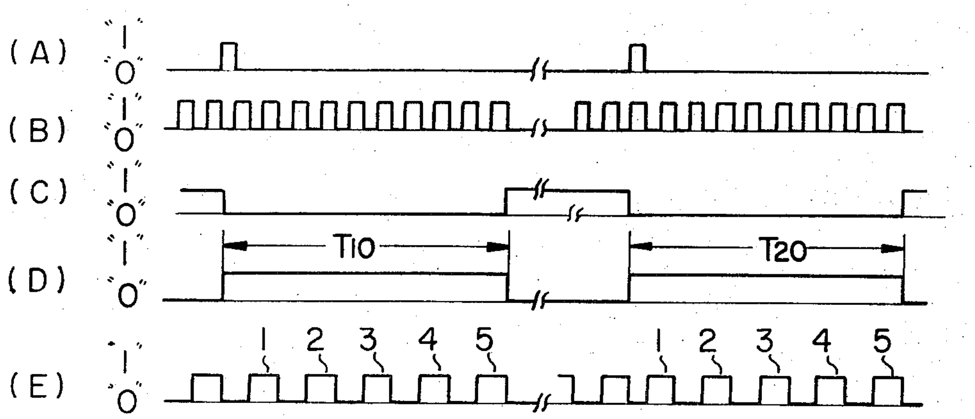

The operation of the second embodiment thus far described will now be explained with reference to the waveforms illustrated in FIGS. 4 and 5. Assuming that the decimal number of an input digital value is 5, FIGS. 4A, B, C and D show the waveforms of the embodiment of FIG. 1, while FIGS. 5A, B, C and D show the waveforms of the embodiment of FIG. 3. In each of FIGS. 4 and 5, A shows the signal waveform applied to the input terminal 5, B shows the signal waveform applied to the input terminal 4, C shows the signal waveform produced at the output terminal 12 of the digital comparator 1 and D shows the signal waveform produced at the output terminal 6, while FIG. 5E shows the signal waveform produced at the output terminal 201 of the frequency divider 20. As will be seen from the waveforms shown in FIG. 4, there is an error between the output pulse widths $T_1$ and $T_2$ at the output terminal 6 which is equal to one clock pulse of the clock pulse inputs to the input terminal 4. In the embodiment of FIG. 3 including the frequency divider 20, although there also results, as will be seen from pulse widths $T_{10}$ and $T_{20}$ shown in FIG. 5D, an error in the pulse width of the pulse signals produced at the output terminal 6 which is equal to one clock pulse of the clock pulse inputs to the input terminal 4, this error is in fact equal to one half-pulse of the pulse inputs to the counting circuit 2, i.e., the pulses at the output terminal 201 of the frequency divider 20, and the error is thus reduced. This dividing ratio of the frequency divider 20 is 2 : 1 and if therefore *N* : 1 division results, the error will be one nth of an input pulse to the counting circuit 2. For example, if, in the embodiment of FIG. 1, the decimal number of an input digital value is 5 and if the output pulse width at the output terminal 6 is to be 5 seconds, then the frequency of clock pulses applied to the input terminal 4 is 1 $H_z$ and hence the output pulse width at the output terminal 6 is in a range between 4 to 5 seconds. On the other hand, where a pulse of 5 seconds duration is to be produced at the output terminal 6 in the embodiment of FIG. 3, if the frequency divider 20 is a 2 : 1 frequency divider comprising a single JK flip-flop 203 as used in this embodiment, then the frequency of clock pulses applied to the input terminal 4 is 2 $H_z$ and hence the output pulse width at the output terminal 6 is 4.5 to 5 seconds. Whereas, if the dividing ratio of the frequency divider 20 is 100 : 1, then the clock pulse frequency is 100 $H_z$ and hence the output pulse width at the output terminal 6 is 4.99 to 5 seconds. Thus, the larger the value of the dividing factor N of the frequency divider 20, the greater is the improvement in the accuracy of the pulse width. In this manner, the accuracy of the output pulse width can be improved without increasing the number of bits for an input digital value.

Figure 6:
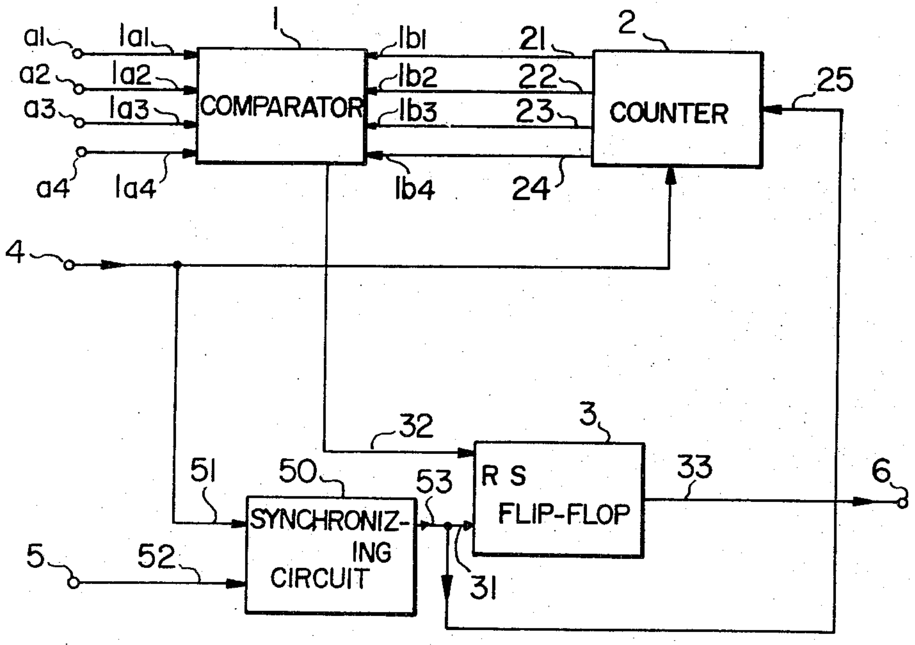
FIG. 6 is a block diagram showing a third embodiment of the apparatus of the present invention.
Figure 7:
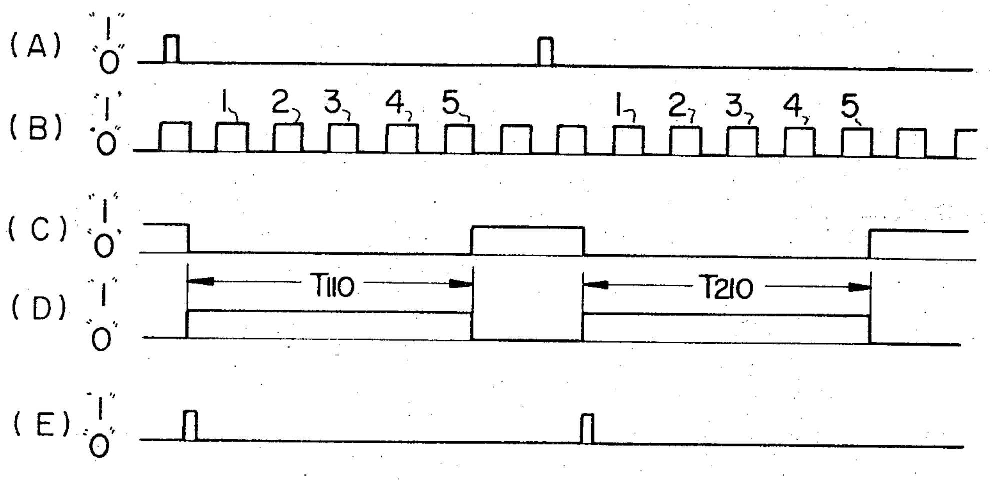
FIG. 7 is a diagram showing the voltage waveforms at various parts of the third embodiment for purpose of explaining the operation thereof.
Figure 11:
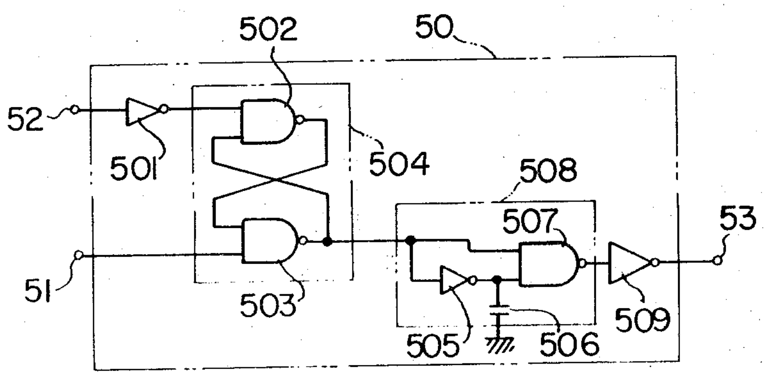
FIG. 11 is a schematic circuit diagram of a synchronizing circuit employed in the embodiment of FIG. 6.

Referring now to FIG. 6, the third embodiment of the invention will be explained. The embodiment of FIG. 6 is identical with the embodiment of FIG. 1 excepting that it further includes a synchronizing circuit 50 shown in FIG. 11. Thus, the digital comparator 1, counting circuit 2 and RS flip-flop 3 are identical with those used in the embodiment of FIG. 1, while the synchronizing circuit 50 comprises, as shown in FIG. 11, an inverter 501, an RS flip-flop 504 composed of a pair of AND gates 502 and 503, a delay circuit 508 composed of an inverter gate 505, a delaying capacitor 506 and an NAND gate 507, and an inverter gate 509. An input terminal 51 is connected to the input terminal 4 for receiving clock pulses and an input terminal 52 is connected to the input terminal 5 for receiving trigger pulses, while an output terminal 53 is connected to the input terminal 31 of the RS flip-flop 3 and the input terminal 25 of the counting circuit 2. The signal waveforms at various parts of the embodiment of FIG. 6 are shown in FIG. 7, in which A shows the signal waveform at the output terminal 5, B shows the signal waveform at the input terminal 4, C shows the signal waveform at the output terminal 12 of the comparator 1. D shows the signal waveform at the output terminal 6, and E shows the signal waveform at the output terminal 53 of the synchronizing circuit 50. The synchronizing circuit 50 performs the logical operation on a clock pulse and a trigger pulse by means of the RS flip-flop 504 and the delay circuit 508, so that a 1 pulse is produced at its output terminal 53 when the trigger pulse is applied and the clock pulse falls from the 1 to 0 level for the first time. The output pulse width thus remains constant at all the times as will be seen from pulse widths $T_{110}$ and $T_{210}$.

Figure 8:
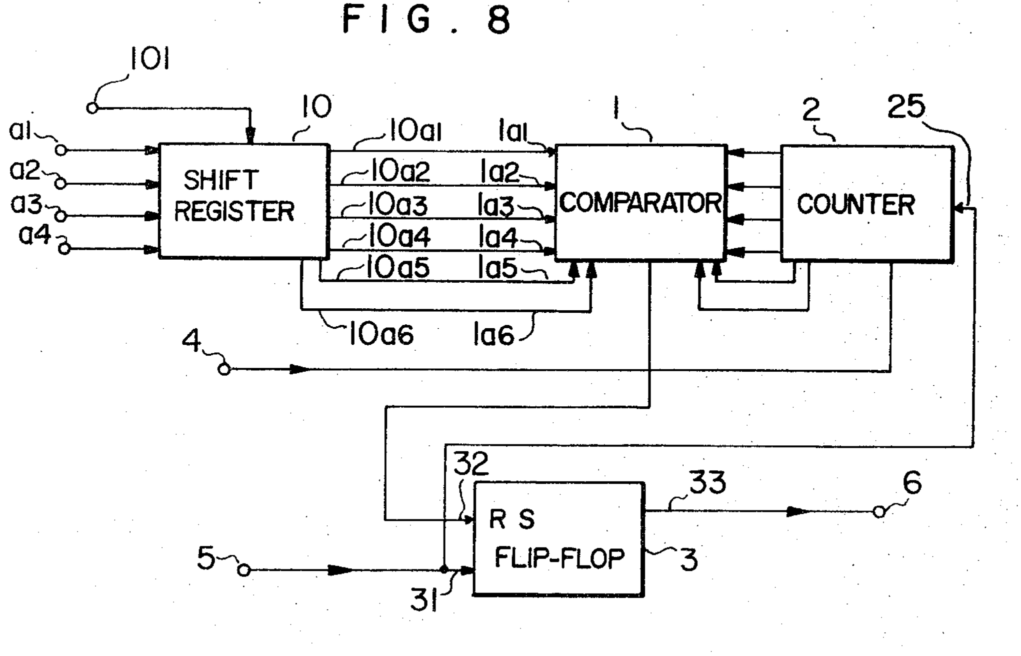
FIG. 8 is a block diagram showing a fourth embodiment of the apparatus of the present invention.
Figure 12:
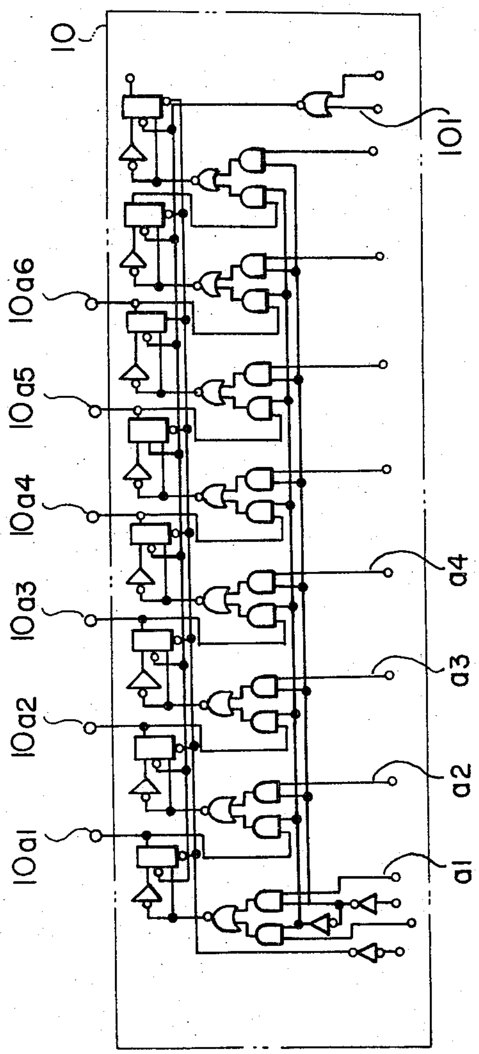
FIG. 12 is a schematic circuit diagram of a shift register employed in the embodiment of FIG. 8.

The fourth embodiment shown in FIG. 8 differs from the embodiment of FIG. 1 in that a shift register 10 is additionally provided between the input terminals $_1a_1$, $_1a_2$, $_1a_3$ and $_1a_4$ and the input terminals $a_1$, $a_2$, $a_3$ and $a_4$ of the comparator 1. The six output terminals of the shift register 10 are connected respectively to the input terminals $_1a_1$, $_1a_2$, $_1a_3$, $_1a_4$, $_1a_5$ and $_1a_6$ of the comparator 1. In this embodiment, while the digital comparator 1 comprises a 6-bit comparator, it can be formed by adding the two unit blocks with the necessary connection to the 4-bit digital comparator 1 of the embodiment of FIG. 1 which is illustrated in FIG. 9. Similarly, the counting circuit 2 comprises a 6-bit counter which can also be formed by adding the two JK flip-flops with the necessary connection to the 4-bit counting circuit 2 illustrated in FIG. 9, while the RS flip-flop 3 is identical with the one employed in the embodiment of FIG. 1. The shift register 10 is of the conventional type shown in FIG. 12 and manufactured and sold by Texas Instrument Inc. of the United States of America.

The operation of this embodiment is as follows. If the decimal number of an input digital value is 5, then the input terminals $a_1 = 1$, $a_2 = 0$, $a_3 = 1$ and $a_4 = 0$. This binary number is then supplied to the shift register 10 so that its output terminals ${}_{10}a_1 = 1$, ${}_{10}a_2 = 0$, ${}_{10}a_3 = 1$, ${}_{10}a_4 = 0$, ${}_{10}a_5 = 0$ and ${}_{10}a_6 = 0$. In this state, the application of a 1 pulse to the input terminal 101 causes a shift so that the output terminals ${}_{10}a_1 = 0$, ${}_{10}a_2 = 1$, ${}_{10}a_3 = 0$, ${}_{10}a_4 = 1$, ${}_{10}a_5 = 0$ and ${}_{10}a_6 = 0$. Thus, this shift is equivalent to increasing the input digital value to 10 which is twice the original value. Similarly, the application of two pulse is equivalent to increasing the input digital value to 20 which is four times the original value. Thus, with the provision of the shift register 10, it is possible to obtain the output pulse widths which are two times, four times, . . . ., 2 $n$ times the input digital value. In other words, it is possible to produce a pulse whose pulse width is the product of the input digital value and a given multiplying factor, without modifying the value of the input to the input terminals $a_1$, $a_2$, $a_3$ and $a_4$.

The novel features of the present invention which have been so far described are summarized as follows:

1. Since the apparatus of the present invention comprises a comparator, a counting circuit and a switching circuit composed for example of an RS flip-flop so as to determine the output pulse width according to an input digital value, unlike the prior art arrangement in which a given pulse width is obtained by varying the values of elements, C and R or L and C, by using an very stable crystal oscillator or the like for its oscillator it is possible to determine the pulse width with very high accuracy. Moreover, since the input digital value can be changed very easily, the pulse width can be varied considerably and the pulse width can also be varied easily by changing the frequency of clock pulses.

2. Provision of a frequency divider in the preceding stage of the counting circuit which is reset simultaneously therewith can further improve the accuracy of the output pulse width synchronized with a trigger pulse.

3. By providing a synchronizing circuit which synchronizes an input trigger pulse with a clock pulse and connecting its output terminal to the input terminal of the switching circuit composed for example of an RS flip-flop and to the reset terminal of the counting circuit, the pulse width obtained subsequent to the generation of a trigger pulse has no degree of deviation from the input digital value.

4. By providing a shift register between the input terminals for receiving an input digital value and the comparator, the pulse width can assume a value represented by $M/N \times 2n$ (where $n$ = an integer greater than zero) for the same value of an input digital value $M$ without changing the clock pulse frequency $N$ $H_z$.

While the specific embodiments of the invention have been illustrated and described, it is not intended to be limited to the details shown, since various modifications and changes may be made without departing in any way from the scope and spirit of the present invention.

I claim:

1. A pulse width setting apparatus for determining a pulse width by receiving clock pulses having a predetermined frequency, a trigger pulse and given binary code signals comprising:

a counter ciruit having a first terminal, a second terminal and output terminals for counting said clock pulses applied to said first input terminal upon receipt of said trigger pulse applied to said second input terminal and generating output binary code signals responsive to the count of said clock pulses at said output terminals;

a comparator circuit having first input terminals for receiving said given binary code signals, second input terminals connected with the output terminals of said counter circuit, and an output terminal, for comparing the value of said output binary code signals with the value of said given binary code signals and generating a signal at said output terminal when said values of both binary code signals become equal to each other; and a switching circuit having a first input terminal for receiving said trigger signal and directly connected to said second input terminal of said counter circuit, a second input terminal connected with the output terminal of said comparator circuit and an output terminal, for generating an output pulse during a period of time starting at the application of said trigger pulse and terminating at the generation of the output signal of said comparator.

2. A pulse width setting apparatus according to claim 1 further comprising, a frequency divider connected with the first terminal of said counter through which said clock pulses are applied to said counter, for counting said clock pulses upon receipt of said trigger pulse and generating output pulses having a divided frequency of that of said clock pulses, whereby said counter circuit counts the output pulses of said frequency divider.

3. A pulse width setting apparatus according to claim 1 further comprising, a synchronizing circuit having a first input terminal for receiving said clock pulses, a second input terminal for receiving said trigger signal and an output terminal connected with the second input terminal of said counter and the first input terminal of said switching circuit, for generating an output pulse formed by delaying said trigger pulse to synchronize with said clock pulses, whereby said counter and said switching circuit receives said output pulse of said synchronizing circuit.

4. A pulse width setting apparatus according to claim 1 further receiving a shift signal and further comprising, a shift register having first input terminal for receiving said given binary code signals, a second input terminal for receiving said shift signal and output terminals connected with the first input terminals of said comparator, for generating output binary code signals formed by shifting said given binary code signals when said shift signal is applied, whereby said comparator receives the output binary code signals of said shift register.

* * * * *